US010767860B2

(12) United States Patent
Knight (10) Patent No.: US 10,767,860 B2
(45) Date of Patent: Sep. 8, 2020

(54) EFFLUENT GAS TREATMENT APPARATUS AND METHOD (71) Applicant: Edwards Limited, Burgess Hill, West Sussex (GB)

(72) Inventor: Gary Peter Knight, Clevedon (GB)

(73) Assignee: Edwards Limited, Burgess Hill, West Sussex (GB)

( * ) Notice: Subject to any disclaimer, the term of this patent is extended or adjusted under 35 U.S.C. 154(b) by 110 days.

(21) Appl. No.: 15/777,023

(22) PCT Filed: Oct. 27, 2016

(86) PCT No.: PCT/GB2016/053338
§ 371 (c)(1),
(2) Date: May 17, 2018

(87) PCT Pub. No.: WO2017/085453
PCT Pub. Date: May 26, 2017

(65) Prior Publication Data
US 2018/0335210 A1 Nov. 22, 2018

(30) Foreign Application Priority Data
Nov. 19, 2015 (GB) .................................. 1520427.4

(51) Int. Cl.
*F23G 5/12* (2006.01)
*F23L 15/02* (2006.01)
(Continued)

(52) U.S. Cl.
CPC ................ *F23G 5/12* (2013.01); *F23G 5/24* (2013.01); *F23G 5/46* (2013.01); *F23G 7/065* (2013.01);
(Continued)

(58) Field of Classification Search
CPC .. F23G 7/066; F23G 2900/00001; F23G 5/24; F23G 5/46; F23G 2206/00; F28C 3/02; F28F 13/003; F28F 2250/04
(Continued)

(56) References Cited

U.S. PATENT DOCUMENTS 2,470,860 A * 5/1949 Parrish ...................... 126/116 R
3,220,460 A * 11/1965 Goubsky ................. F23C 7/004
431/238
(Continued)

FOREIGN PATENT DOCUMENTS

CA 2226202 C 4/1999
CN 102116481 A 7/2011
(Continued)

OTHER PUBLICATIONS

JP-55143306-A—English translation (Year: 1980).*
(Continued)

Primary Examiner — Jorge A Pereiro
(74) Attorney, Agent, or Firm — Theodore M. Magee; Westman, Champlin & Koehler, P.A.

(57) ABSTRACT

A treatment apparatus for treating an effluent gas includes a combustion chamber; a burner; an inlet for receiving secondary combustion air; an exhaust gas outlet for outputting exhaust gases from the combustion chamber; and a heat exchanger. The heat exchanger is configured to exchange heat between a first fluid and a second fluid flowing through respective first and second fluid flow paths. The first fluid flow path is connected to the inlet and the second fluid flow path is connected to the outlet such that the exhaust gases received at the outlet flow into the second fluid flow path. The heat exchanger comprises a fluid flow communication path for providing a path for flow of a portion of the exhaust gases from the second fluid into the first fluid; and at least (Continued)

one inlet aperture for inputting the first fluid to the combustion chamber.

18 Claims, 7 Drawing Sheets

(51) Int. Cl.
    *F23G 5/24*       (2006.01)
    *F23G 5/46*       (2006.01)
    *F23G 7/06*       (2006.01)

(52) U.S. Cl.
    CPC .......... *F23L 15/02* (2013.01); *F23G 2206/00* (2013.01); *F23G 2206/10* (2013.01); *F23G 2207/50* (2013.01); *F23G 2209/14* (2013.01); *F23G 2209/142* (2013.01); *F23G 2900/00001* (2013.01); *F23L 2900/07002* (2013.01); *F23L 2900/07003* (2013.01); *Y02E 20/348* (2013.01)

(58) Field of Classification Search
    USPC ...... 431/5; 422/203, 204, 205, 207; 110/254
    See application file for complete search history.

(56) References Cited

U.S. PATENT DOCUMENTS

| | | | | |
|---|---|---|---|---|
| 3,549,333 A | * | 12/1970 | Tabak | F23G 7/066 422/173 |
| 3,604,824 A | * | 9/1971 | Hardison | F23G 7/066 431/116 |
| 3,806,322 A | * | 4/1974 | Tabak | F23G 7/066 422/170 |
| 4,122,823 A | * | 10/1978 | Hunter | F23L 15/04 126/117 |
| 4,445,842 A | * | 5/1984 | Syska | F23C 9/00 431/115 |
| 5,200,155 A | * | 4/1993 | Obermueller | F23G 7/066 110/203 |
| 5,427,746 A | * | 6/1995 | Pereira | F23G 7/066 110/210 |
| 5,558,783 A | * | 9/1996 | McGuinness | B01J 3/008 210/180 |
| 6,029,614 A | | 2/2000 | Kayahara et al. | |
| 6,918,757 B2 | * | 7/2005 | Nakamura | F23C 6/045 431/171 |
| 2004/0006978 A1 | * | 1/2004 | Beck | F01N 3/021 60/289 |
| 2004/0154284 A1 | * | 8/2004 | Abdul-Khalek | F02M 35/02 60/279 |
| 2007/0272201 A1 | * | 11/2007 | Amano | F23C 6/045 123/295 |
| 2009/0126918 A1 | * | 5/2009 | Campagna | F28D 7/1607 165/164 |
| 2014/0090804 A1 | * | 4/2014 | Samz | F28F 1/022 165/81 |
| 2015/0369126 A1 | * | 12/2015 | Knopfel | F02C 3/34 60/772 |
| 2016/0161116 A1 | * | 6/2016 | Strobel | F23G 5/12 431/215 |

FOREIGN PATENT DOCUMENTS

| | | | |
|---|---|---|---|
| CN | 104501203 A | | 4/2015 |
| DE | 3107664 A1 | | 9/1982 |
| DE | 102010012005 A1 | | 9/2011 |
| EP | 0560678 A1 | * | 9/1993 ............ F23G 5/46 |
| EP | 2884174 A1 | | 6/2015 |
| JP | 55143306 A | * | 11/1980 |
| JP | 2007198682 A | | 8/2007 |
| WO | 2006101987 A2 | | 9/2006 |

OTHER PUBLICATIONS

EP-0560678-A1—English translation (Year: 1993).*
British Search Report dated Jan. 27, 2016 and Examination Report dated Jan. 28, 2016 for corresponding British Application No. GB1520427.4.
PCT Search Report and Written Opinion dated Jan. 25, 2017 for corresponding PCT Application No. PCT/GB2016/053338.
First Office Action dated Jan. 28, 2019 for corresponding Chinese Application No. CN201680067725.X.

* cited by examiner

EFFLUENT GAS TREATMENT APPARATUS AND METHOD

CROSS-REFERENCE OF RELATED APPLICATION

This application is a Section 371 National Stage Application of International Application No. PCT/GB2016/053338, filed Oct. 27, 2016, which is incorporated by reference in its entirety and published as WO 2017/085453 A1 on May 26, 2017 and which claims priority of British Application No. 1520427.4, filed Nov. 19, 2015.

FIELD OF THE INVENTION

Embodiments relate to treatment systems for treating effluent gases and in particular, to such systems having a burner within a combustion chamber.

BACKGROUND

Effluent gases output from processes such as process chambers for processing semiconductors require treatment to reduce the amount of undesirable chemicals output. For example, the semiconductor manufacturing industry may output residual perfluorinated compounds (PFCs) and other dangerous process gases such as $NH_3$ and $NF_3$ in the effluent gas stream pumped from the process tool. These chemicals may be difficult to remove from the effluent gas and their release into the environment is undesirable because they may be noxious and/or have relatively high greenhouse activity. Thus, treatment or abatement apparatus are required to reduce these undesirable chemicals from being output.

Known treatment apparatus use combustion to remove the undesirable compounds from the effluent gas stream. It is desirable to improve the combustion and abatement efficiency not only to increase the removal of dangerous process gases such as $NH_3$ and $NF_3$ but also to reduce the emissions of combustion by-products (e.g. CO, HC and $NO_x$).

In many such combustion chambers a mixture of fuel and air are supplied to the burner to generate a flame and secondary combustion air is added to the combustion chamber. However, adding this secondary combustion air downstream of the burner head can disrupt the flame structure on the burner head and quench the temperature of the combustion chamber shortly after the process gas has passed the burner head limiting the useful residence time of the process gas in the high temperature zone. This disruption of the flame leads to combustion of particle forming process gas (e.g. Silane) in close proximity to the burner head resulting in deposition of Silica on the head and importantly in process inlet nozzles. The disruption of the flame structure also allows process gas to bypass the flame so that emissions of process gases such as Nitrogen Trifluoride are higher than necessary. The premature quenching of the flame also leads to higher than necessary emissions of Carbon Monoxide and unburnt Hydrocarbons.

The premature quenching of the combustion zone has a supplementary effect when the abatement of Ammonia is considered. Currently a substantial flow of Hydrogen gas has to be added to a stream of Ammonia process gas to ensure that the combustion chamber temperature and high temperature zone length are sufficient to allow the thermal decomposition of all the Ammonia into Nitrogen and Hydrogen and subsequent combustion of the Hydrogen. Combustion of Nitrogen containing species such as Nitrogen Trifluoride or Ammonia can lead to the formation of significant quantities of Nitrogen Oxides via the Fuel-NOx mechanism. Environmental regulation requires that these emissions be reduced. One way of doing this may be to use depleted oxygen air in the combustion chamber and this can be provided by recirculating the exhaust gas, however, this again can lead to undue turbulence with the associated problems outlined above.

It would be desirable to provide a good mixture of flame and incoming gases without generating undue turbulence which may lead to particulates formed during the combustion process not being exhausted but fouling parts of the combustion chamber such as the burner heads. It would also be desirable to provide efficient combustion while limiting the amount of NOx compounds that are exhausted.

The discussion above is merely provided for general background information and is not intended to be used as an aid in determining the scope of the claimed subject matter. The claimed subject matter is not limited to implementations that solve any or all disadvantages noted in the background.

SUMMARY

A first aspect of the embodiments provide a treatment apparatus for treating an effluent gas comprising: a combustion chamber; a burner; an inlet for receiving secondary combustion air; an exhaust gas outlet for outputting exhaust gases from said combustion chamber; a heat exchanger for exchanging heat between a first fluid and a second fluid flowing through respective first and second fluid flow paths, said first fluid flow path being connected to said inlet such that said secondary combustion air flows from said inlet into said first fluid flow path and said second fluid flow path being connected to said outlet such that said exhaust gases received at said outlet flow into said second fluid flow path; said heat exchanger comprising a fluid flow communication path for providing a path for flow of a portion of said exhaust gases from said second fluid into said first fluid; and at least one inlet aperture for inputting said first fluid to said combustion chamber.

The inventor recognised that there are competing requirements when optimising a combustion chamber for treating a processing gas and in particular when inputting secondary combustion air to the chamber. In this regard mixing is required between the secondary combustion air and the effluent gas if it is to improve combustion, however, increased turbulence within the combustion chamber can have negative effects, possibly reducing the residence time of the effluent gases within the high temperature regions, allowing bypass of this region by some of the effluent gases and where particulates are generated during the combustion causing fouling of the burner heads.

These problems can be magnified where the secondary combustion air is cool and where it contains exhaust gases from the combustion chamber as a source of depleted oxygen air. Such gases will increase the particulates within the combustion chamber leading to increased fouling where turbulence is a problem.

These competing problems have been addressed by the use of a heat exchanger in the present invention to exchange heat between a flow of exhaust gas and a flow of secondary combustion air. This allows not only the secondary combustion air to be pre-heated prior to being input to the combustion chamber but it also has the further advantage of cooling the exhaust gas allowing its exhaust from the system to be performed using lower cost ducts and in a safer manner. Furthermore, using a heat exchanger that is adapted to mix a portion of the exhaust gas with the secondary combustion air provides secondary combustion air with a depleted oxygen content where some mixing of the two fluids occurs prior to input to the combustion chamber.

As noted above a problem with introducing exhaust gases into the combustion chamber is that they may well have particulates within them which makes it particularly important that turbulence is controlled. Using the heat exchanger to not only exchange heat between the two fluid flows but also to allow a portion of the exhaust gas to be introduced into the secondary combustion air flow provides a depleted oxygen secondary combustion air flow that is pre-heated and that can be introduced into the combustion chamber as a single flow. The introduction of the gases in a single flow allows control of required mixing and turbulence to be performed for just the one fluid flow and with the additional advantage of providing combustion air that is pre-heated and has a depleted oxygen content. Furthermore, exhaust gas that is cooled is also generated.

In some embodiments, said fluid flow communication path is configured to provide at least one of a predetermined quantity and proportion of said second fluid to said first fluid.

The addition of a portion of the exhaust gases into the secondary combustion air may help to deplete the oxygen content of that combustion air and also provide some additional warming of the inlet gases. However, it is important that the amount of this gas is controlled if the combustion of the process gases is to provide the desired amount of oxidation. In this regard, adding a depleted oxygen air may reduce the amount of oxidation of nitrogen gases into undesirable $NO_x$ gases, however other gases present will require oxidation. Thus, it is important that the amount of the depletion of the oxygen is controlled and this can be achieved by controlling the proportion and/or amount of exhaust gases that are added to the secondary combustion air.

In some embodiments, said fluid flow communication path comprises a calibrated flow inlet extending from said second fluid flow path into a venturi within said first fluid flow path.

One way of providing a predetermined proportion of this second fluid to the first fluid is by the use of a venturi with a calibrated flow inlet. A venturi has the advantage of being a simple device that has no moving parts. The environment close to the combustion chamber is very hot and the exhaust gases may be acidic and contain particles. Thus, in these circumstances devices with moving parts may fail. Furthermore, they may require servicing which can be inconvenient. The use of a venturi avoids these disadvantages and is a simple yet elegant way of providing a desired quantity of exhaust gases to the secondary combustion flow, allowing the quantities to be determined by choice of calibrated flow inlet in dependence upon the effluent gases that are to be treated.

In some embodiments, said venturi comprises an additional inlet facing said calibrated flow inlet and operable in a cleaning mode to receive a gas at an increased pressure, said gas at said increased pressure acting to clear particulates from said calibrated flow inlet.

Although the venturi has no moving parts and is therefore a robust way of providing a required amount of fluid, it may become blocked where the fluid contains particles. Thus, it may be advantageous to provide an inlet facing the calibrated flow inlet such that the calibrated flow inlet may be periodically cleaned by a blast of cleaning gas allowing the removal of any particles that may have built up around the inlet surface.

In some embodiments, said first fluid flow path comprises a plurality of tubes and said second fluid flow path comprises a further tube said plurality of tubes being within said further tube.

Although, the heat exchanger can be designed in a number of ways provided that there is a surface across which heat between the two fluids can be exchanged, one convenient way of providing the heat exchanger is by providing a plurality of tubes for receiving the first fluid, that is the combustion air to be heated, these plurality of tubes being within a further tube through which the second fluid which comprises the exhaust gases flow. In this way, the exhaust gases heat the tubes within which the secondary combustion air flows. It should be noted that it is desirable if the flow direction of the two fluids are in opposing directions so that the hottest exhaust gases contact the already heated combustion air. Thus, the exhaust gases may exit from the end of the combustion chamber remote from the burner and travel along the combustion chamber wall towards the burner, whereas the secondary combustion air may be input at the end close to the burner and travel towards the exhaust gas inlet.

In some embodiments, the treatment apparatus comprises a cooling jacket arranged around said combustion chamber and said heat exchanger, said cooling jacket being configured to receive a flow of cooling fluid, said heat exchanger being configured such that said exhaust gas flow is output to said cooling fluid within said cooling jacket at a plurality of output apertures arranged at different locations around an outer circumference of said heat exchanger.

It may be desirable for the outer surface of the combustion chamber and heat exchanger to be cooled for safety reasons and thus, a cooling jacket that holds a cooling fluid which may be cooling air or may be cooling liquid, may be placed around the combustion chamber and heat exchanger and a flow of cooling air may pass through it. The exhaust gases to be exhausted from the combustion chamber may be output to this cooling fluid and this reduces their temperature allowing them to be ducted away from the combustion chamber in a safer manner with reduced heating of the ducts. Furthermore, where the exhaust gas is output to the cooling fluid via a plurality of apertures arranged at different circumferential locations, then the exhaust gases mix with the cooling fluid and this avoids or at least reduces local heating of the ducts, allowing for a greater range of materials to be used to form these ducts and also allowing for a safer use.

In some embodiments, said plurality of output apertures are arranged around a circumferential outer surface of said further tube.

Where the heat exchanger comprises a plurality of tubes in which the combustion air flows within an outer tube through which the exhaust gas flows, then the apertures outputting the exhaust gas may be arranged around a circumferential outer surface of this further tube and in some cases they may be arranged in a spiral around the circumference such that not only is their output at different circumferential positions, but also at different longitudinal positions, further encouraging mixing of the exhaust gases with the cooling fluid.

In some embodiments, said further tube is configured to receive said exhaust gases at one end and said plurality of output apertures are arranged towards the other end of said further tube.

As the exhaust gases flow through a heat exchanger prior to being output, it may be desirable for the output to be at the end of the further tube away from the inlet of the exhaust gas allowing time for heat to be exchanged with the secondary combustion air.

In some embodiments, said plurality of tubes are connected to an inner tube arranged within said further tube such that said first fluid flows from said plurality of tubes to said inner tube, said at least one aperture comprising a plurality of inlet apertures lying on an inner surface of said inner tube.

The secondary combustion air may be output to the combustion chamber via apertures in the chamber walls. The chambers walls may form the inner surface of a pipe like structure into which the secondary combustion gas is output on exiting the heat exchanger.

In some embodiments, said plurality of inlet apertures are arranged in a plurality of rings along a length of an outer surface of said combustion chamber.

As noted previously, the input of the secondary combustion air into the combustion chamber can have undesired effects of reducing the temperature of the chamber, causing quenching of the flame and causing undue turbulence which may result in particulates collecting on the burner heads. However, some mixing of the secondary combustion air with the effluent gases during combustion is required in order for the secondary combustion air to have the desired effect. It is therefore important that this mixing is carefully controlled to provide the desired amount of mixing without undue turbulence. The provision of a plurality of inlet apertures arranged in rings along a length of an outer surface of the combustion chamber allows the secondary combustion air comprising a portion of the exhaust gases to be input at controlled points and in a controlled manner. Furthermore, the pre-heating of the gases and the input of the desired proportion of exhaust gas provides secondary combustion air with a desired depleted oxygen level and at an increased temperature. This further acts to improve the efficiency of the combustion and reduce undesired turbulence.

In some embodiments, said plurality of inlet apertures have a size that varies along a length of said combustion chamber.

A further way of controlling the turbulence and mixing of the secondary combustion air with the effluent gases is to vary the size of the apertures through which the secondary combustion air enters the combustion chamber. In this way, careful control of the quantity and flow of the secondary combustion gases can be provided which again can affect the turbulence and provide the desired flow. It should be noted that the variation will depend on the particular design and the particular process. In some cases, it may be desirable to have apertures of decreasing size such that the apertures are smaller closer to the exhaust outlet than they are closer to the burner.

In some embodiments, said at least one inlet aperture comprise a fluid deflecting element associated with said aperture.

A further way of controlling the flow input of this fluid is by the use of fluid deflecting elements which may take the form of fins and which can be designed to direct the flow in a required direction. In some cases, this may be to direct the flow along the walls of combustion chamber away from the burner heads. Such a flow may form a curtain around the edge of the combustion chamber helping to keep the effluent gases towards the hotter central regions. There may be fluid deflecting elements associated with each aperture or there may be fluid deflecting elements associated with a subset of apertures.

In some embodiments, said deflecting elements are configured to deflect fluid output by said corresponding inlet away from said burner in order to reduce the probability of particles within the fluid caused during combustion of the effluent gases being deflected towards the burners and fouling them. In this regard, conventionally where depleted oxygen combustion air has been provided by exhaust gases this has been done by recirculation of these gases within the combustion chamber. This necessarily caused flow back towards the burner heads resulting in increased fouling. By adding the exhaust gases to the secondary combustion air before entry to the combustion chamber, then the depletion of oxygen in this air is achieved prior to entry into the combustion chamber and there are no requirements to mix the combustion air and the exhaust gas within the chamber and therefore the requirements to send the exhaust gas back towards the burner heads to mix it with the combustion air are no longer present.

Although, this treatment apparatus may be advantageous in many types of combustion chamber, it is particularly advantageous where the burner is an open flame burner as these are particularly prone to becoming blocked by particulates.

Furthermore, where the burner comprises a plurality of burner heads then turbulence within the combustion chamber may cause the flames to interact and particles produced by one to foul the burner head of the other and thus, in such arrangements the proposed treatment apparatus is particularly advantageous.

In some embodiments, said exhaust gas outlet is at an opposite end of said combustion chamber to said burner.

As noted previously, it is desirable if the exhaust gases are kept remote from the burner heads and thus, providing the exhaust gas outlet at an opposite end of the combustion chamber to the burner allows the flow to be directed away from the burner towards the outlet reducing the fouling of the burner heads.

Although the heat exchanger may be arranged remotely from the combustion chamber, it is advantageous if it is arranged around the combustion chamber as this provides a compact system and also allows the combustion chamber heat to provide some heating of the secondary combustion air and the secondary combustion air to provide some cooling of the outer portion of the combustion chamber.

A second aspect of the present invention provides, a method of treating an effluent gas using a burner within a combustion chamber said method comprising: receiving secondary combustion air at an inlet; passing said secondary combustion chamber through a first fluid flow path within a heat exchanger for exchanging heat between a first fluid and a second fluid flowing through respective first and second fluid flow paths; passing exhaust gases from said combustion chamber through said second fluid flow path within said heat exchanger, said heat exchanger comprising a flow connecting path between said first and second fluids such that a portion of said second fluid flowing through said heat exchanger flows into said first fluid; inputting said first fluid to said combustion chamber through a plurality of apertures.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

Embodiments will now be described further, with reference to the accompanying drawings, in which.

DETAILED DESCRIPTION

Before discussing the embodiments in any more detail, first an overview will be provided.

A treatment apparatus that includes a heat exchanger for transferring heat from hot combustion gases exhausted from a treatment gas apparatus to the incoming combustion air is disclosed. Such an apparatus provides a way of depleting the oxygen within the combustion air by adding a certain proportion of the hot exhaust gases to that combustion air. It does this within a heat exchanger where the hot exhaust gases are brought into thermal contact with the cooler combustion air by flowing the two on either side of a conductive surface such that heat exchange occurs. Furthermore, providing a flow communication path of a limited size through the conductive surface allows some of the exhaust gases to flow into the secondary combustion air providing a depleted oxygen secondary combustion air. By allowing the introduction of the exhaust gases within the heat exchanger in this way, the secondary combustion air is further increased in temperature and some mixing of the secondary combustion air and exhaust gases will occur before input to the combustion chamber.

The heat exchanger design in some embodiments is similar to a shell and tube heat exchanger design with tube bundles carrying the incoming combustion air surrounded by an annular space through which the hot combustion exhaust gases pass.

In an alternative design, the hot combustion exhaust gases may pass through the heat exchanger tubes while the incoming combustion air passes around the tubes in the annular space. In either case, there is a fluid flow communication path between the two so that the preheated combustion air contains a proportion of the exhaust gas. This gas is then directed into another annular space with ports to the combustion chamber providing carefully controlled injection of the gas into the combustion chamber with attention being paid to the direction of the flow near the combustor or burner head so that the flame structure is not significantly perturbed.

By the use of exhaust gas recirculation, the amount of $NO_x$ emissions from the burner may be controlled.

Attempts to increase the process gas capacity of an open-flame burner have generally revolved around increasing the fuel flow into the burner to increase the combustion temperature and length of high temperature zone. Whilst this can improve the process gas capacity it is generally limited by the efficiency of combustion especially as the total process flow and gas velocity rises. The emissions of Nitrogen Oxides, Carbon Monoxide and unburnt Hydrocarbons can become unacceptable. Note that the TA Luft environmental emission regulations require that both NOx and CO be jointly considered. Thus, it is important to address the efficiency of the combustion as fluid flows rise.

A problem may arise in air-cooled designs where the cooling air (sometimes referred to as Fifth stage or ED-1 air) also enters the combustion chamber prematurely due to poor design of the system fluid dynamics. This also leads to premature quenching of the combustion chamber with all the associated problems described above and re-entrainment of particulate.

Currently the hot combustion chamber gases do not mix well with the cooling air leading to hotspots in the combustor and exhaust. Additionally the cooling air does not fully sweep the combustor of particulate.

All of the above are addressed by embodiments of the invention that provide pre-heating of the secondary combustion air, controlled oxygen depletion of this air, controlled flow of this air into the combustion chamber along with cooling of the exhaust gases prior to output.

Figure 1:
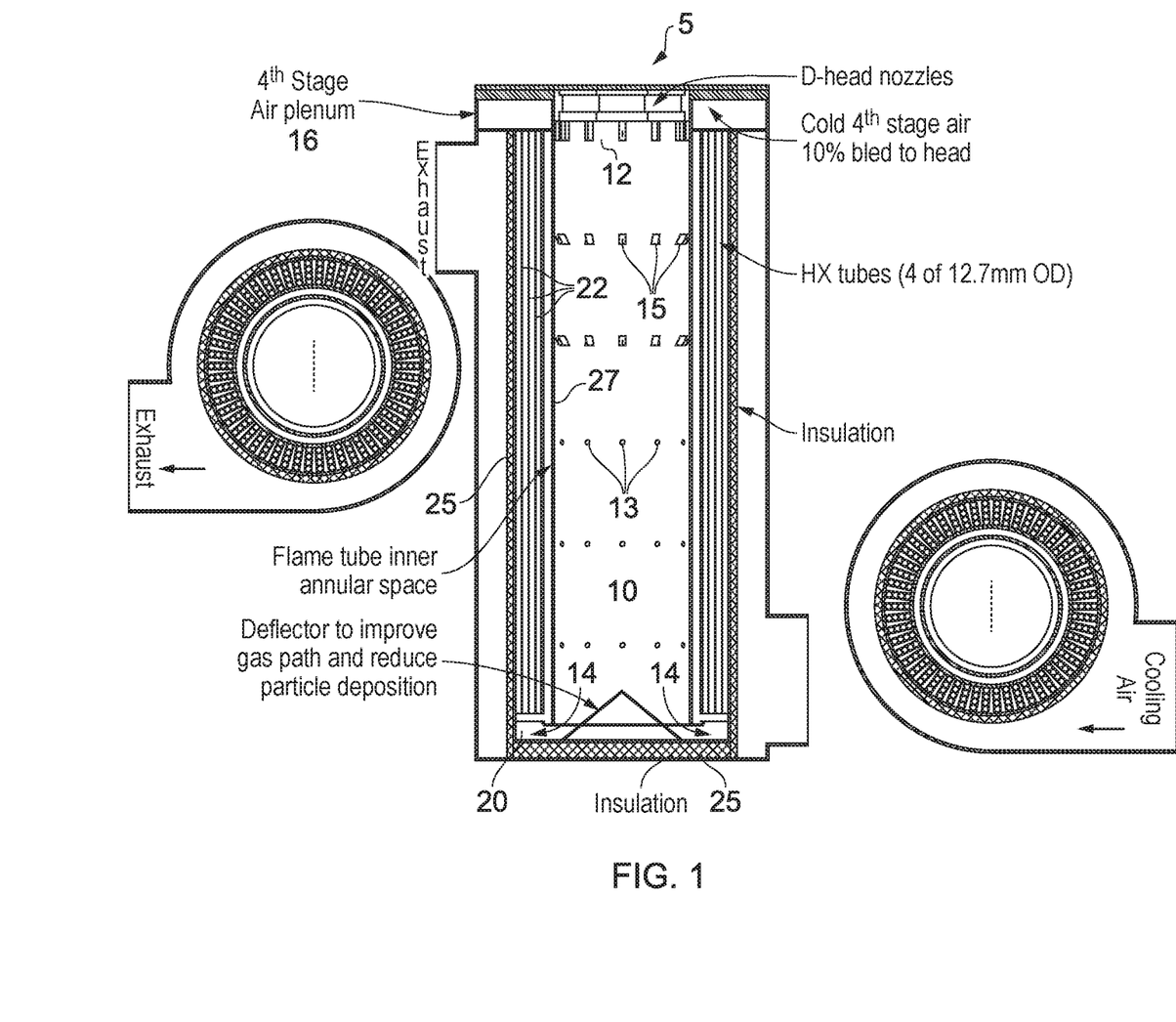
FIG. 1 shows a combustion chamber and heat exchanger according to an embodiment.

FIG. 1 shows an example embodiment comprising a combustion chamber 10 having burner heads 12 at one end and an exhaust gas outlet 14 at an opposing end. There are fluid deflectors arranged adjacent to the exhaust gas outlet to channel the flow and reduce particulate deposition. There is a fuel and air mix inlet to the burner heads, not shown, and a further secondary combustion air inlet 16 through which secondary combustion air enters the processing apparatus 5. A proportion of this secondary combustion air, in this case 10%, is sent directly across the head to the burners to cool the burner heads. The rest is directed down through heat exchanger 20 flowing through a plurality of tubes 22. These plurality of tubes 22 are held within a further outer tube or shell which provides an annular space that is bounded on the outside by an insulating layer 25 and on the inside by an inner tube 27. This annular space provides a path for the exhaust gases output via exhaust gas output 14 to travel up through the heat exchanger 20.

Within the heat exchanger 20, the hot exhaust gases are bought into contact with the cooler secondary combustion air and heat is exchanged between the two. Furthermore, there is a flow communication path between at least some of the tubes 22 and the flow path through which the exhaust gases flow allowing a proportion of the exhaust gases to enter the secondary combustion air causing oxygen depletion of this secondary combustion air.

The depleted oxygen secondary combustion air then enters the inner tube 27 and rises up around the inner edge of the combustion tube 10. There are inlet apertures 13 providing a flow path from this inner tube 27 into the combustion chamber 10. Thus, the secondary combustion air comprising a portion of exhaust gases enters the combustion chamber through these apertures. The size of the apertures and the flow deflector plates 15 associated with them can be selected to control the flow of this secondary combustion air and provide the required degree of mixing while limiting turbulence.

Figure 2A:
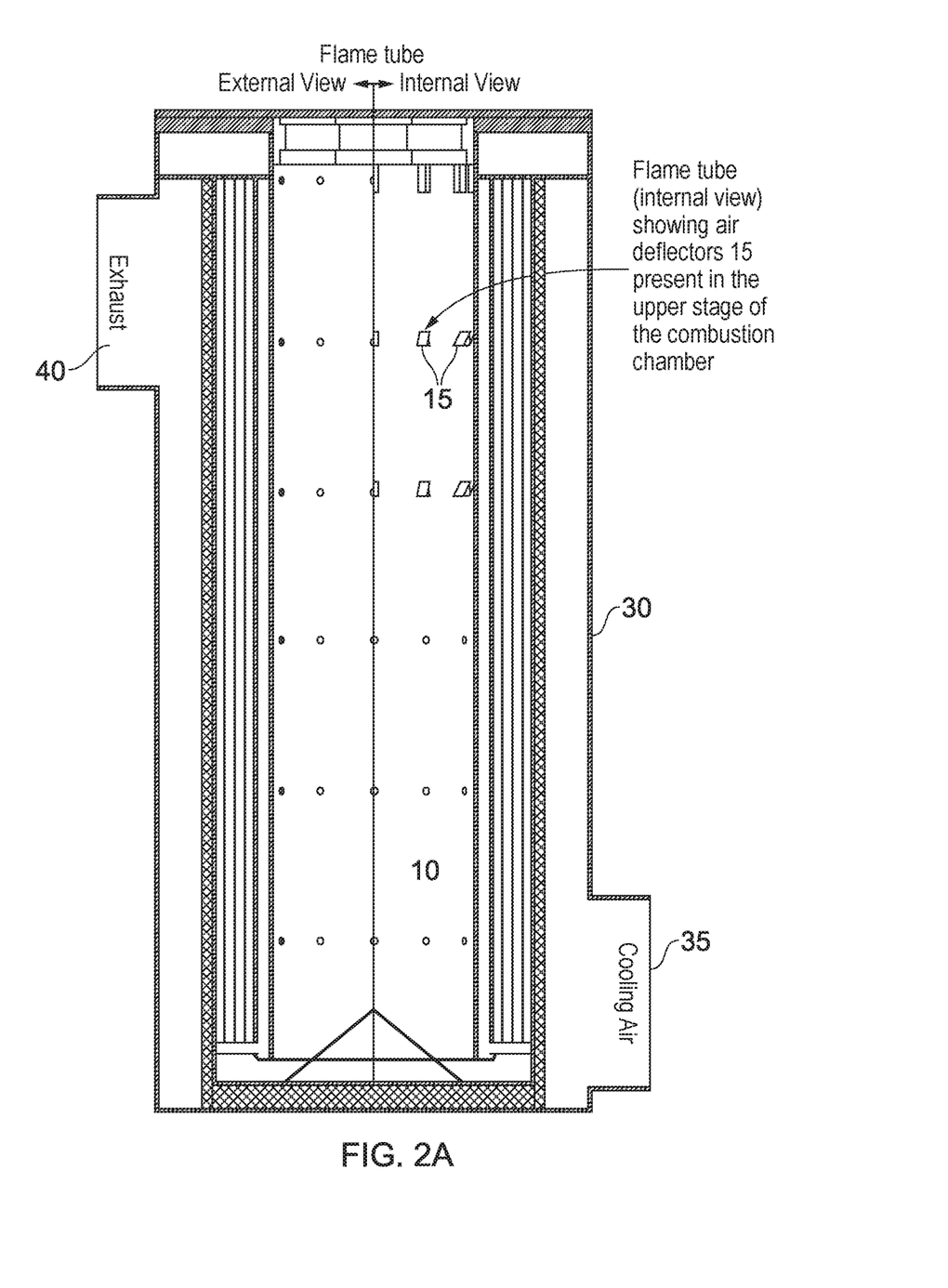
FIG. 2A shows an internal view and external view of a combustion chamber according to an embodiment.

FIG. 2A shows these flow deflector plates 15 in a little more detail and how in this embodiment they are angled to deflect the input secondary combustion air down away from the burner heads, reducing the amount of exhaust gases that reach the burners and may cause fouling of the burner heads. There is a cooling jacket 30 around the heat exchanger which has an input 35, for receiving a cooling fluid, which in this case is cooling air and an output 40 for outputting a mixture of the cooling air and exhaust gases. This cooling air is swirled around the outer surface of the combustion chamber within the cooling jacket 30 reducing the exterior surface temperature of the device giving a safer device and also acting to mix with the hot exhaust gases to provide a looler exhaust. This allows the gases to be safely vented and reduces the cost of materials used in the vents.

Figure 2B:
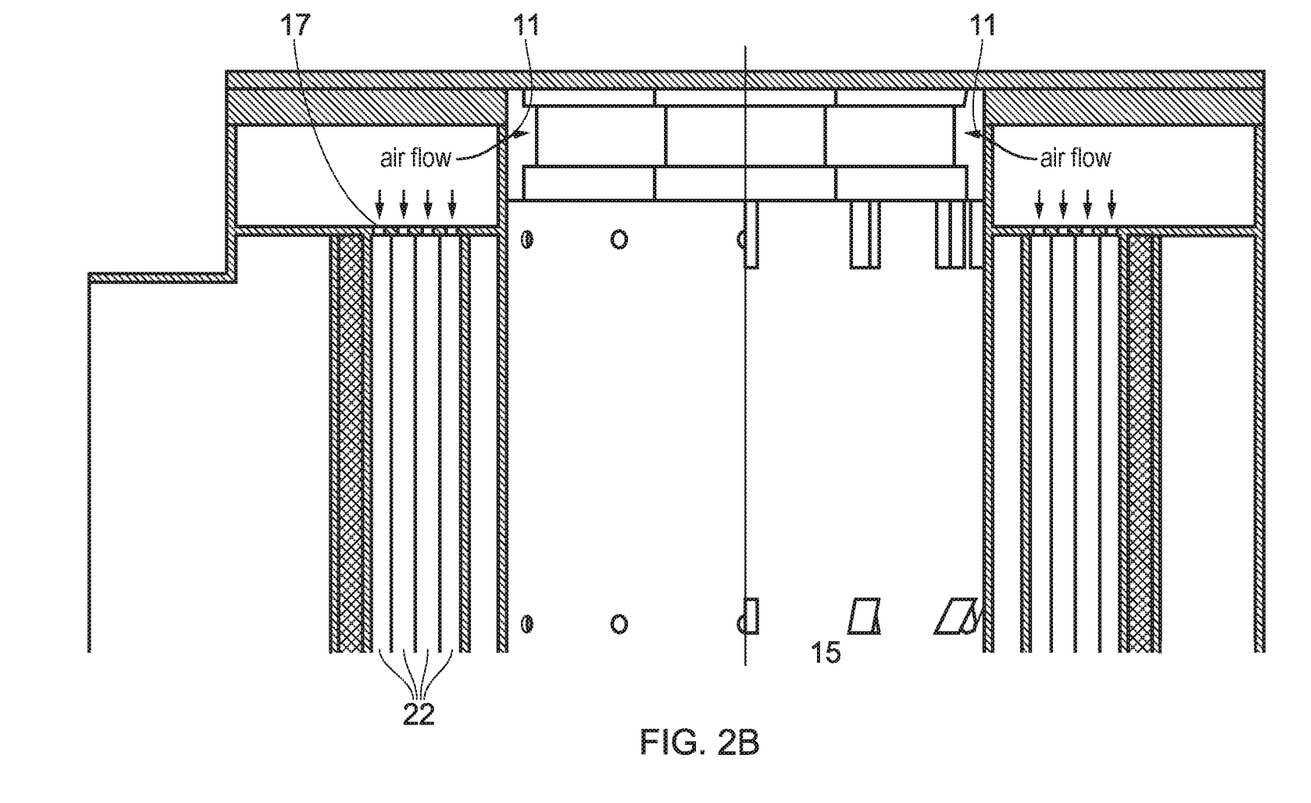
FIG. 2B shows an expanded view of the upper portion of FIG. 2A.

FIG. 2B shows an exploded view of the burner head portion of the combustion chamber shown in FIG. 2A with the inlets 11 that allow a portion of the secondary combustion air to pass directly over the burner heads to cool them, shown. The rest of the combustion air passes though openings 17 into the heat exchanger tubes 22. Typically 10% of the air is used for cooling with the rest being input to the combustion chamber after passing through the heat exchanger.

Figure 3:
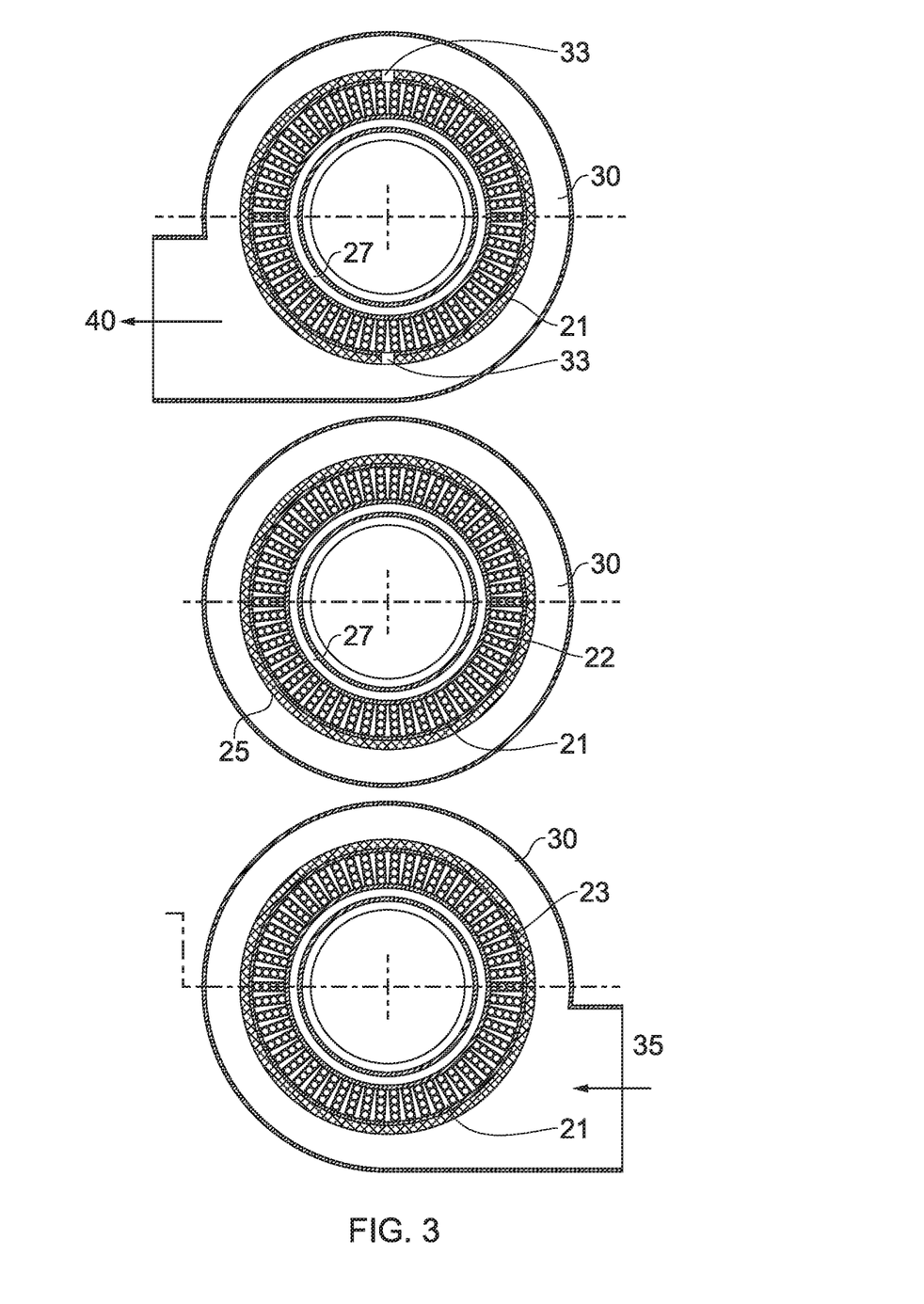
FIG. 3 shows a cross section through the combustion chamber and heat exchanger including the outlets for exhausting the exhaust gas into the cooling fluid according to an embodiment.

FIG. 3 shows cross sections through the treatment apparatus along different portions of its length. The upper cross section shows the exhaust gas and cooling air output 40, along with outlet apertures 33 for outputting exhaust gas from the heat exchanger into the swirling cooling air within jacket 30. These apertures are placed at different circumferential positions on the heat exchanger outer wall and at different heights, although all of them are towards the upper end to allow for a significant heat exchange path prior to output. The distribution of these apertures increases mixing of the exhaust gas and the cooling air.

The lower cross section shows the cooling air input 35 for inputting the cooling air to the cooling jacket 30. All three show the shell 21 which is bounded by the inner tube 27 and outer insulating layer 25 and in which the heat exchanger tubes 22 are found and which provides the flow path for the exhaust gases.

Figure 4:
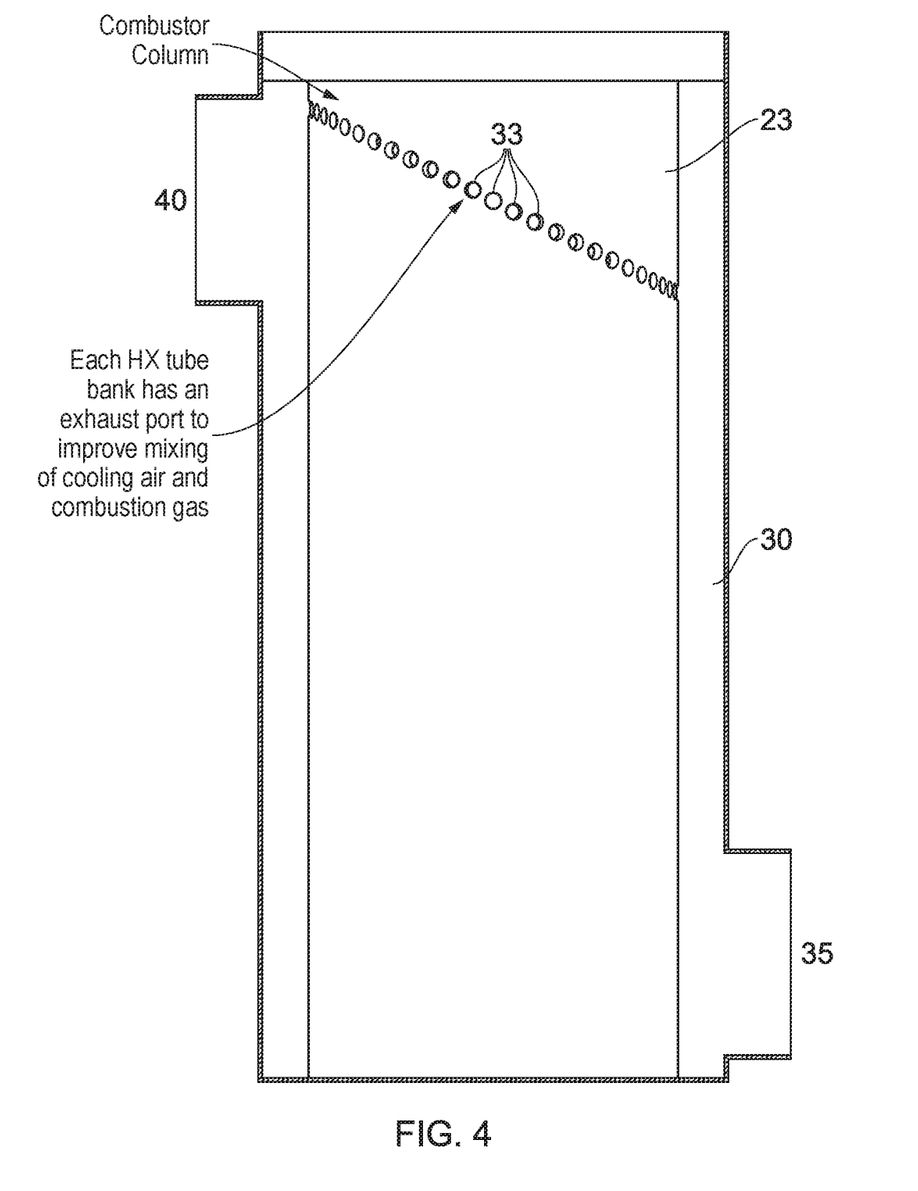
FIG. 4 shows an external view of the outer tube of the heat exchanger according to an embodiment.

FIG. 4 shows the outer tube 23 of the heat exchanger within the cooling jacket 30. There are a number of outlet apertures 33 which allow the exhaust gas flowing within the outer tube 23 to exit into the cooling jacket 30. Providing different circumferential and longitudinal positions for the exhaust gas outlets 33 towards the exhaust gas/cooling air outlet 40 allows for the exhaust gas to remain within the heat exchanger for longer whilst also providing mixing of the exhaust gases with the cooling air. In some embodiments, the cooling air is swirled around the cooling jacket by fluid deflecting arrangements, not shown, and by the arrangement of the inlet 35 and outlet 40. This increases the mixing of the combustion air and exhaust gases and reduces any localised hotspots.

As noted above, the cooling air which enters the outer space 30 around the combustion chamber is tangentially directed such that the gas spins rapidly sweeping the whole of the annular space as it ascends the outside of the combustion chamber. Towards the top of the combustion column, exhaust gas holes 33 allow the escape of the hot combustion gas from the heat exchanger assembly into the rapidly spinning cooling air ensuring rapid and complete or near complete mixing of the two gas streams. This arrangement also prevents or at least impedes the cooling air from prematurely entering the combustion chamber through the apertures for outletting the exhaust gas.

Figure 5:
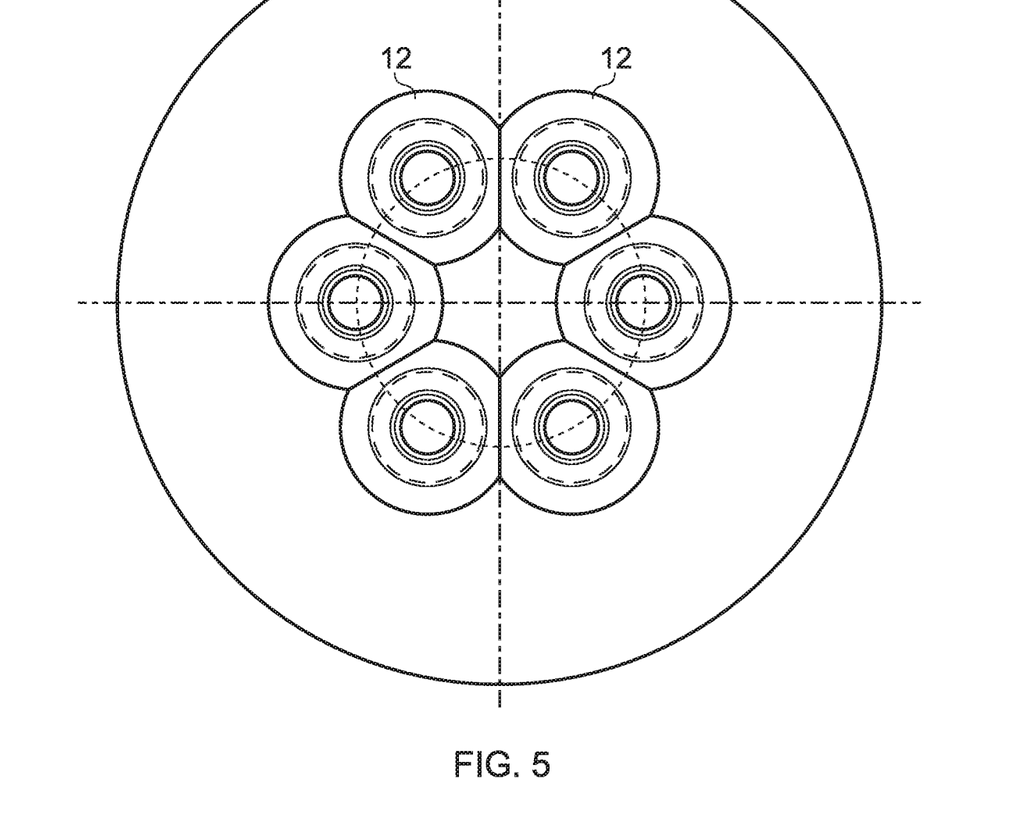
FIG. 5 shows a burner head arrangement with s a plurality of burner heads arranged in a circular array.

FIG. 5 shows a burner head arrangement according to an embodiment in which there are a plurality of burner heads 12 arranged in a circular array. Such an arrangement is an efficient way of providing a burner, however turbulence needs to be limited as it is undesirable that the particulates generated by the burning at one burner head are swept towards another burner head 12 as this may cause fouling of the burner head.

In this regard, in conventional combustion tubes, rotation of the combustion gases may be promoted to encourage mixing. However, with a multi-nozzle head this may be undesirable and in embodiments a simple downward flow of the secondary combustion gas, having depleted oxygen content, is promoted using fluid deflector fins 15 which act to direct the input gases along the combustion tube wall away from the burner heads. This flow helps to sweep combustion materials away from the heads while providing the required addition of combustion gases to promote combustion.

In some embodiments, the combustion chamber is between 1 and 1.5 m long which may be longer than previous designs. This in conjunction with the preheated combustion gas leads to a significantly longer residence time for the process gases in the hot combustion zone and a higher mean temperature. When designing the heat exchanger, the dimensions of the tubes in the annular space should be designed to take into account the heat flows and pressure drops both forced convective and radiated heat transfer and also to allow for an inevitable fouling of the heat exchanger.

Figure 6:
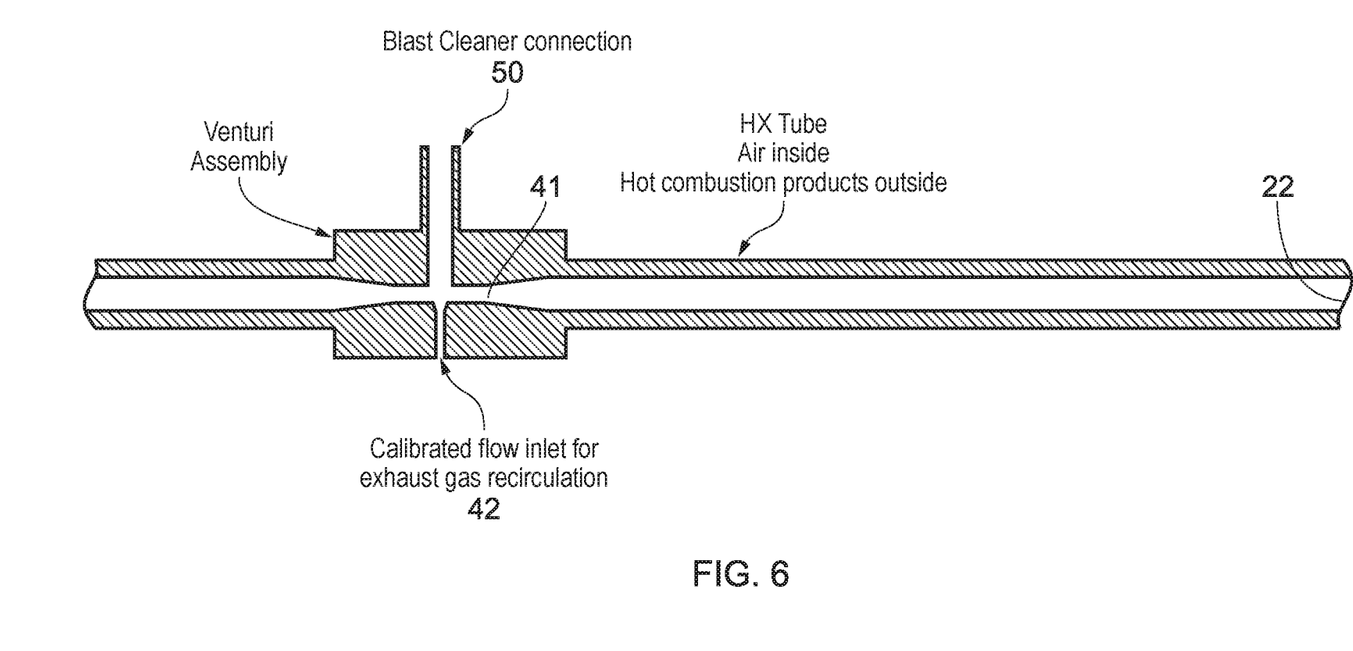
FIG. 6 shows a calibrated flow inlet venturi for providing exhaust gas recirculation.

FIG. 6 shows the venturi 41 which is provided within all or a subset of the heat exchanger tubes 22 in some embodiments and which provides a reduced pressure allowing exhaust gases to be sucked into the tube 22 through a calibrated flow inlet 42. In this way, by providing a calibrated flow inlet 42 of a particular size, a desired amount of exhaust gas can be sucked from the exhaust gas flow and recirculated into the combustion chamber with the secondary combustion air. In this way the depletion levels of the oxygen within the combustion air can be controlled. As noted previously, a problem with exhaust gases to deplete the oxygen in the combustion air is that particulates are present which can cause fouling. As the calibrated flow inlet's size determines the amount of exhaust gas that is sucked through it, then it is desirable that this does not become fouled. A blast cleaner connection 50 can be provided on this venturi 41 which allows air to be periodically blown across the flow inlet and clear any deposited particulates. This method of cleaning the venturi assembly avoids the need for electrically operated cleaning mechanisms in the vicinity of high-temperature acidic gases.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A treatment apparatus for treating an effluent gas comprising:
   a combustion chamber;
   a burner;
   an inlet for receiving secondary combustion air;
   an exhaust gas outlet for outputting exhaust gases from said combustion chamber;
   a heat exchanger for exchanging heat between a first fluid and a second fluid flowing through respective first and second fluid flow paths, said first fluid flow path being connected to said inlet such that said secondary combustion air flows from said inlet into said first fluid flow path and said second fluid flow path being connected to said outlet such that said exhaust gases received at said outlet flow into said second fluid flow path;
   said heat exchanger comprising a fluid flow communication path for providing a path for flow of a portion of said exhaust gases from said second fluid into said first fluid; and
   at least one inlet aperture for inputting said first fluid to said combustion chamber wherein said at least one inlet aperture comprises a fluid deflecting element associated with said aperture.

2. The treatment apparatus according to claim 1, wherein said fluid flow communication path is configured to provide at least one of a predetermined quantity and proportion of said second fluid to said first fluid.

3. The treatment apparatus according to claim 1, wherein said fluid flow communication path comprises a calibrated flow inlet extending from said second fluid flow path into a venturi within said first fluid flow path.

4. The treatment apparatus according to claim 3, wherein said venturi comprises an inlet facing said calibrated flow inlet and operable in a cleaning mode to receive a gas at an increased pressure, said gas at said increased pressure acting to clear particulates from said calibrated flow inlet.

5. The treatment apparatus according to claim 1, wherein said first fluid flow path comprises a plurality of tubes and said second fluid flow path comprises a further tube said plurality of tubes being within said further tube.

6. The treatment apparatus according to claim 5, wherein said plurality of tubes are connected to an inner tube arranged within said further tube such that said first fluid flows from said plurality of tubes to said inner tube, said plurality of inlet apertures lying on an inner surface of said inner tube.

7. The treatment apparatus according to claim 6, further comprising a cooling jacket arranged around said combustion chamber and said heat exchanger, said cooling jacket being configured to receive a flow of cooling fluid, said heat exchanger being configured such that said exhaust gas flow is output to said cooling fluid within said cooling jacket at a plurality of output apertures arranged at different locations around an outer circumference of said heat exchanger wherein said plurality of output apertures are arranged around a circumferential outer surface of said further tube.

8. The treatment apparatus according to claim 7, wherein said further tube is configured to receive said exhaust gases at one end and said plurality of output apertures are arranged towards the other end of said further tube.

9. The treatment apparatus according to claim 7, wherein said plurality of output apertures are arranged in a spiral around a circumference of said outer surface of said further tube.

10. The treatment apparatus according to claim 1, comprising a cooling jacket arranged around said combustion chamber and said heat exchanger, said cooling jacket being configured to receive a flow of cooling fluid, said heat exchanger being configured such that said exhaust gas flow is output to said cooling fluid within said cooling jacket at a plurality of output apertures arranged at different locations around an outer circumference of said heat exchanger.

11. The treatment apparatus according to claim 1, wherein said at least one inlet aperture comprises a plurality of inlet apertures arranged in a plurality of rings along a length of an outer surface of said combustion chamber.

12. The treatment apparatus according to claim 1, wherein said at least one aperture comprises a plurality of inlet apertures having a size that varies along a length of said combustion chamber.

13. The treatment apparatus according to claim 1, said deflecting element is configured to deflect a fluid output by said corresponding inlet aperture away from said burner.

14. The treatment apparatus according to claim 1, wherein said burner comprises an open flame burner.

15. The treatment apparatus according to claim 1, wherein said burner comprises a plurality of burner heads.

16. The treatment apparatus according to claim 1, wherein said exhaust gas outlet is at an opposite end of said combustion chamber to said burner.

17. The treatment apparatus according to claim 1, wherein said heat exchanger is arranged around said combustion chamber.

18. A method of treating an effluent gas using a burner within a combustion chamber said method comprising:
   receiving secondary combustion air at an inlet;
   passing said secondary combustion air through a first fluid flow path within a heat exchanger for exchanging heat between a first fluid and a second fluid flowing through respective first and second fluid flow paths;
   passing exhaust gases from said combustion chamber through said second fluid flow path within said heat exchanger, said heat exchanger comprising a flow connecting path between said first and second fluids such that a portion of said second fluid flowing through said heat exchanger flows into said first fluid;
   inputting said first fluid to said combustion chamber through at least one aperture wherein said at least one inlet aperture comprises a fluid deflecting element associated with said aperture.

* * * * *